United States Patent
Deussen et al.

(10) Patent No.: US 9,073,421 B2
(45) Date of Patent: Jul. 7, 2015

(54) MOLDING ELEMENT FOR JOINING A PART TO A FIXED WINDOW PANE OF A VEHICLE

(71) Applicants: Martin Deussen, Marburg (DE); Lutz Bergmann, Ehringshaussen (DE); Wolfgang Platt, Biedenkopf (DE); Michael Ortmueller, Dautphetal-Herzhausen (DE); Hartmut Roth, Biedenkopf (DE)

(72) Inventors: Martin Deussen, Marburg (DE); Lutz Bergmann, Ehringshaussen (DE); Wolfgang Platt, Biedenkopf (DE); Michael Ortmueller, Dautphetal-Herzhausen (DE); Hartmut Roth, Biedenkopf (DE)

(73) Assignee: ELKAMET KUNSTSTOFFTECHNIK GMBH, Biedenkope (DE)

( * ) Notice: Subject to any disclaimer, the term of this patent is extended or adjusted under 35 U.S.C. 154(b) by 0 days.

(21) Appl. No.: 14/363,319

(22) PCT Filed: Sep. 20, 2012

(86) PCT No.: PCT/EP2012/068582
§ 371 (c)(1),
(2) Date: Jun. 6, 2014

(87) PCT Pub. No.: WO2013/091919
PCT Pub. Date: Jun. 27, 2013

(65) Prior Publication Data
US 2014/0327267 A1 Nov. 6, 2014

(30) Foreign Application Priority Data
Dec. 23, 2011 (DE) .......................... 10 2011 056 955

(51) Int. Cl.
B62D 65/08 (2006.01)
B60J 10/00 (2006.01)
B60J 10/02 (2006.01)

(52) U.S. Cl.
CPC .......... *B60J 10/0088* (2013.01); *B60J 10/0011* (2013.01); *B60J 10/0014* (2013.01); *B60J 10/0062* (2013.01); *B60J 10/0071* (2013.01); *B60J 10/02* (2013.01)

(58) Field of Classification Search
CPC ............... B60J 10/0011; B60J 10/0014; B60J 10/0062; B60J 10/0071; B60J 10/0088; B60J 10/02
USPC ........................................................... 296/93
See application file for complete search history.

(56) References Cited

U.S. PATENT DOCUMENTS

| | | | |
|---|---|---|---|
| 6,722,731 B2 | 4/2004 | Cornils et al. | |
| 6,769,700 B2 * | 8/2004 | Ortmuller et al. | 277/642 |
| 7,806,455 B2 * | 10/2010 | Polke | 296/93 |
| 7,870,958 B1 | 1/2011 | Gross et al. | |
| 2003/0057660 A1 | 3/2003 | Ortmuller et al. | |
| 2011/0115261 A1 * | 5/2011 | Platt et al. | 296/208 |
| 2011/0285177 A1 | 11/2011 | Flammer et al. | |

(Continued)

FOREIGN PATENT DOCUMENTS

| | | |
|---|---|---|
| DE | 20008555 U1 | 8/2000 |
| DE | 19961706 A1 | 7/2001 |

(Continued)

*Primary Examiner* — Pinel Romain
(74) *Attorney, Agent, or Firm* — Leydig, Voit & Mayer, Ltd.

(57) ABSTRACT

A molding element for joining a part to a vehicle window pane includes a molding body having a first section configured to be secured to an edge of the window pane and a second section including a latching recess being configured to receive, in an insertion direction, a rib of the part through an engagement opening so as to detachably fasten the part to the molding element. A closure element is formed on the molding body so as to at least partially close off the latching recess.

29 Claims, 10 Drawing Sheets

(56) References Cited

U.S. PATENT DOCUMENTS

2014/0062037 A1 3/2014 Platt et al.

FOREIGN PATENT DOCUMENTS

| DE | 102006038013 A1 | 2/2008 |
| DE | 202008016217 U1 | 4/2009 |
| DE | 202008006986 U1 | 10/2009 |
| DE | 102008050130 A1 | 4/2010 |
| DE | 102009010015 A1 | 8/2010 |
| EP | 0249560 A1 | 12/1967 |
| EP | 1724141 A1 | 11/2006 |
| FR | 2945521 A1 | 11/2010 |
| WO | 2006002891 A2 | 1/2006 |

* cited by examiner

MOLDING ELEMENT FOR JOINING A PART TO A FIXED WINDOW PANE OF A VEHICLE

CROSS-REFERENCE TO PRIOR APPLICATIONS

This application is a U.S. National Phase application under 35 U.S.C. §371 of International Application No. PCT/EP2012/068582 filed on Sep. 20, 2012, and claims benefit to German Patent Application No. DE 10 2011 056 955.3 filed on Dec. 23, 2011. The International Application was published in German on Jun. 27, 2013 as WO 2013/091919 A1 under PCT Article 21(2).

FIELD

The invention relates to a molding element for joining a part to a window pane of a vehicle as well as to a sealing arrangement.

BACKGROUND

When it comes to motor vehicles, it is often necessary to join a part to a window pane of a vehicle. For instance, at the lower edge of a windshield, there is normally a water trough or a water trough cover that is designed to collect and laterally drain water that runs off the windshield. In order to secure such a water trough cover to the windshield and seal it, a molding element is normally used which is joined to the vehicle windshield at the edge and which has a latching groove that detachably holds the water trough cover. The water trough cover is provided with a rib that is positively and/or non-positively held by the latching groove, so that if necessary, the cover can be removed and put back in place repeatedly.

Several embodiments of such molding elements are disclosed, for example, in German patent application DE 199 61 706 A1, in German utility models DE 200 08 555 U1, DE 20 2008 006 986U1 or DE 20 2008 016 217 U1.

Such molding elements can also be used in rear windows, for example, if a water trough or a water drain is provided at the lower edge of the rear window. It is likewise conceivable to use them in conjunction with car body parts such as, for example, door frames, window frames, trim strips or covers that have to be joined to firmly installed side windows.

These molding elements, which are typically produced by means of extrusion, are elongated molding strips having a lengthwise extension and a cross section that is perpendicular thereto and that is adapted to the window pane contour in question. Prior to being mounted on or bonded to the windshield, these molding elements have to be bent in order to be adapted to the specific contour of the edge of the window pane. In this process, the latching grooves, which have relatively narrow tolerance requirements, can become deformed to such an extent that joining the water trough cover is very difficult or even impossible. The same risk exists when a molding element is mounted on the window pane, especially if a U-shaped molding element has to be pressed onto the edge of the window pane.

Another factor is that each molding element is usually joined to the lower edge of the window pane before the window is installed in the vehicle, and also that, due to their brittleness, the window panes are normally transported while standing on their lower edge. The weight alone of the vehicle window panes makes it virtually impossible to prevent deformations inside the molding elements, thus causing problems later on when the water trough cover is latched into the latching groove.

Another drawback of the prior-art molding elements is that they can easily get dirty when the window panes are being transported or stored if dirt particles accumulate in the latching groove. These particles can also hinder the latching of the water trough cover, which time and again gives rise to delays and problems during the installation.

In order to remedy this, so-called keder rails are used which are temporarily inserted with a core section into the latching groove or into the latching recess of the molding element. As a result, the molding element is protected during the manufacture, further processing or finishing and/or during transportation of the vehicle window panes, and the relatively fragile latching groove can neither be deformed nor get dirty.

Known embodiments of such keder rails are disclosed, for example, in international patent application WO 2006 002 891 A2, German patent application DE 10 2006 038 013 A1, French application FR 2 945 521 A1 or U.S. Pat. No. 7,870, 958 B1.

A disadvantage here is that, for every molding element, a separate keder rail or protective rail has to be produced, inserted into the molding element before the molding element is mounted on the vehicle window pane, and subsequently removed again before the adjoining part is installed in the vehicle. All of this causes extra logistical work and entails additional costs. Moreover, the removed keder rails or protective rails have to be disposed of at considerable cost since they cannot be recycled.

Furthermore, the keder rails are often difficult to remove from the latching grooves or latching recesses because the molding elements are bent along the edge of the window pane and because usually an undercut is created for the rib of the water trough cover. As a result, the core section is latched or clamped inside the keder rail, and consequently, a great deal of force and time are needed to remove the likewise bent keder rail from the molding element. Moreover, the molding element can be damaged when the keder rail is removed, especially if unsuitable tools such as screwdrivers or pliers are employed. This also gives rise to additional expenditures in terms of time and money.

SUMMARY

In an embodiment, the present invention provides a molding element for joining a part to a vehicle window pane. A molding body has a first section configured to be secured to an edge of the window pane and a second section including a latching recess being configured to receive, in an insertion direction, a rib of the part through an engagement opening so as detachably fasten the part to the molding element. A closure element is formed on the molding body so as to at least partially close off the latching recess.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
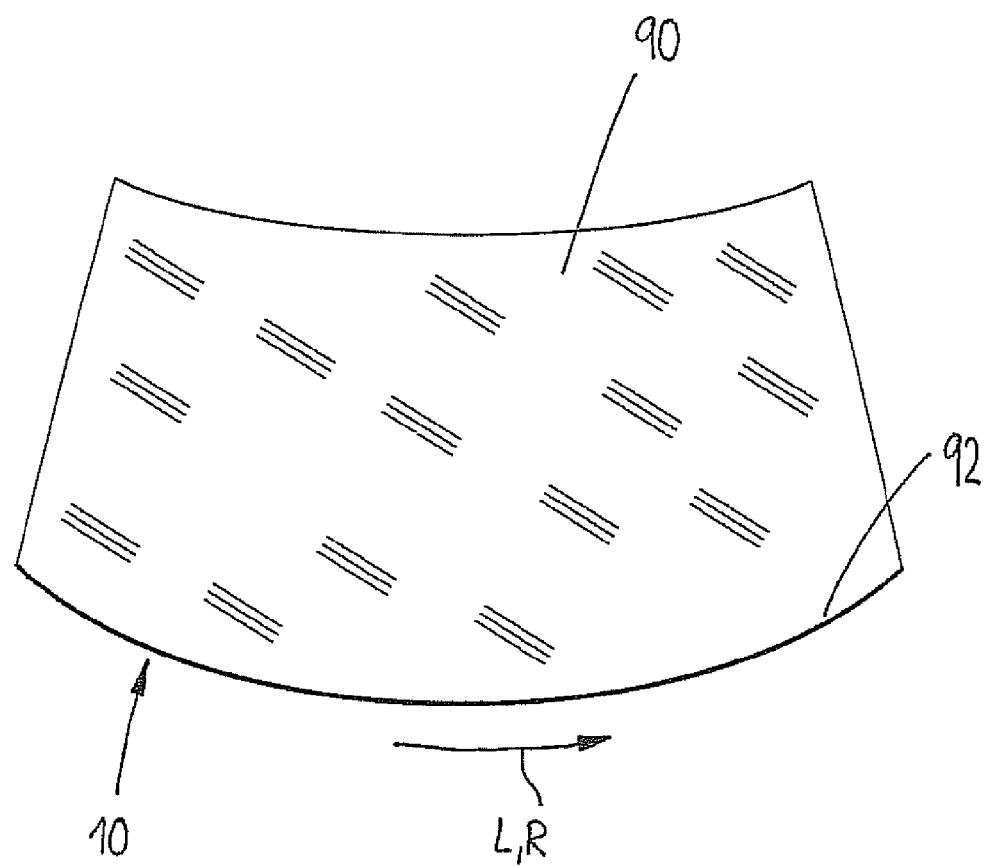
FIG. 1 a top view of a vehicle window pane whose lower edge has a molding element according to an embodiment of the invention that is intended for joining a part to the vehicle window pane.

In an embodiment, the present invention recognizes and overcomes the above-described drawbacks and other drawbacks of the state of the art, and provides a molding element for joining a part to a window pane of a vehicle, which molding element is protected against getting dirty as well as against deformation or damage. Moreover, it should be possible to produce the molding element inexpensively and employing simple means, and it should also always ensure a reliable and fast joining of the part to the vehicle window pane.

When it comes to a molding element for joining a part to a vehicle window pane—comprising a molding body whose first section can be secured to an edge of a vehicle window pane and whose second section, for purposes of detachably fastening the part to the molding element, has a latching recess which extends in the lengthwise extension of the molding element and into which a rib of the part can be secured positively and/or non-positively—an embodiment of the invention provides that a closure element that at least partially closes off the latching recess is formed on the molding body.

The formation of a closure element on the molding body according to an embodiment of the invention entails the advantage that the latching recess is always reliably protected against the penetration of dirt during the mounting of the molding element on the edge of the vehicle window pane as well as during transportation or storage of the vehicle window panes that have already been fitted with a molding element. When the closure element is opened or removed in order to latch the part in place after the window pane has been installed in the vehicle, the rib of the part can always reliably engage with the latching recess since the latter will not be clogged by dust or other dirt.

Another major advantage of the molding body according to an embodiment of the invention is that, when the closure element is in its closed position, it stabilizes and supports the molding body and thus the latching recess in its entirety. Therefore, as long as the latching recess is closed off by the closure element, the latching recess can neither be deformed nor damaged, and this is achieved without the use of a separate keder rail.

Consequently, before the molding element is mounted, it can thus be bent so as to be easily adapted, for example, to the contour of the vehicle window pane. The narrow tolerance requirements for the latching recess are always exactly observed by the closure element. When the molding element is being mounted on the edge of the vehicle window pane, the gap dimensions of the latching recess are retained by the closure element over the entire length of the molding element, even if the molding has to be pressed onto the edge of the window pane using a great deal of force.

Irrespective of all of this, the vehicle window panes fitted with a molding element according to an embodiment of the invention can be transported and stored while standing upright on the molding element. Here, too, the closure element that closes off the latching recess reliably protects the molding body against deformation or damage. Once the vehicle window pane has been installed, the closure element is opened and the part can be quickly and conveniently installed since the tolerance dimensions of the latching recess are observed very exactly over the entire length of the molding.

There is no longer a need for separate keder rails or protective rails, which have to be laboriously incorporated into the molding elements prior to the further processing and/or mounting of these elements, and which subsequently have to be removed once again with a great deal of force and effort before the water trough cover can be installed, and these are all aspects that have a positive effect on the production costs. In fact, the handling of the molding elements is also greatly simplified since entire assembly and handling steps can be completely eliminated. Moreover, there is no longer a need for the expensive disposal of removed keder rails or protective rails, an aspect which likewise has a positive impact on the total costs.

Consequently, once the molding body according to an embodiment of the invention has been secured to the edge of the vehicle window pane, an adjacent part can be quickly and easily joined to the vehicle window pane at any time in that the rib formed on the part is inserted into the latching recess of the molding body after the closure element has been opened. In this case, the positive and/or non-positive connection ensures that the part is always reliably and tightly secured to the window pane and that it can no longer accidentally become detached from the molding body or from the window pane, for example, during operation of the vehicle.

From a production engineering standpoint, it is favorable for the closure element to be joined to the molding element along the lengthwise extension of the latter. This makes it possible to produce the molding elements by means of extrusion, which likewise has a positive impact on the production costs. In this case, the lengthwise extension of the molding element corresponds to the direction of extrusion.

An embodiment of the invention provides that the closure element closes off the engagement opening of the latching recess when in a first functional position and that it opens it when in a second functional position. In the first functional position, the closure element fulfils two functions: it protects the latching recess against the penetration of dirt and, in its function as a support element, it protects the latching recess against deformation by external forces that act upon the molding body. In the second functional position, in contrast, the rib of the part can enter the latching recess unhindered and can latch there with the molding body.

Advantageously, the closure element is a flat element whose plane is oriented essentially perpendicular to the edge of the vehicle window pane. In this manner, the closure element can always reliably and tightly close off the latching recess. Moreover, when the molding body has been mounted on the vehicle window pane, the plane of the closure element is approximately in the same plane as the vehicle window pane, so that forces that act upon the molding element parallel to the vehicle window pane can always be reliably absorbed by the closure element. Therefore, the closure element, in its first functional position, also constitutes a support element that temporarily stabilizes the latching recess. If, in contrast, the latching recess is penetrated perpendicular to the plane of the closure element—be it by means of a tool or with the rib of the part—then the closure element is pushed aside. The closure element makes a transition from its first functional position into its second functional position, and the rib can be reliably secured in the latching recess.

In order for the closure element to be quickly and reliably opened and moved out of the first into the second functional position at any time, an embodiment of the invention also provides for a hinge area to be formed between the molding body and the closure element. This hinge area can be formed by a tapering of the material, for example, in the form of a film hinge. However, it is likewise conceivable to employ a transition area that is located between the molding body and the closure element and that is made of a different, if applicable, softer or more elastic, material. If different materials are used in the molding body, it can advantageously be manufactured by means of co-extrusion.

In a practical manner, the closure element is joined as a single piece to the molding body or else it is bonded integrally to the molding body. As a result, only one element has to be manufactured, which has a very positive impact on the production costs and on the logistics involved. In particular, there is no longer a need for the laborious removal and disposal of separate keder rails.

Depending on the requirements that the molding element has to meet in terms of the forces that act upon the molding body, the molding body and the closure element can be made of the same material or else different materials are employed. Thus, for instance, the molding body can consist of a harder material while the closure element is made of a softer material, or vice versa. The important aspect here is always that the closure element in its first functional position can offer sufficient support for the molding body or for the latching recess, and that it reliably makes the transition into the second functional position during the opening procedure and/or when the rib of the part is inserted into the latching recess.

Here, it is advantageous if, according to an embodiment of the invention, one single closure element is provided that is hinged on the molding body on a first side of the latching recess along the lengthwise extension of the molding element. On the second side of the latching recess, opposite from the first side, when the closure element is in its first functional position, it is engaged positively and/or non-positively with the molding body along the lengthwise extension of the molding element. Owing to this stable and yet severable connection, the closure element remains securely closed during the bending or mounting of the molding element as well as during the transportation of the vehicle window panes.

Once the molding element and the vehicle window pane have been securely installed, the latching recess can then be opened at any time in that the positive and/or non-positive connection between the closure element and the molding body is severed and the closure element is moved out of its first functional position into the second functional position. This can be done with a separate tool. However, the closure element can also be opened with the rib of the part in that the rib is placed onto the closure element which is then forced into the latching recess when the rib is pressed inwards until the closure element has reached its second functional position and the rib is secured positively and/or non-positively in the latching recess.

A variant of this embodiment provides that, in the first functional position, the closure element is joined to the molding body via a tapered area along the lengthwise extension of the molding element on the second side of the latching recess, opposite from the first side. This tapered area is dimensioned in such a way that a sort of predetermined breaking point is created that initially holds the closure element in its closing and supporting position (first functional position). As soon as the connection between the closure element and the molding body is severed or broken open, the closure element makes a transition into the second functional position and the rib of the water trough cover can be secured in the latching recess.

In another embodiment of the invention, two closure element parts are provided, whereby, along the lengthwise extension of the molding element, a first closure element part is hinged on a first side of the latching recess, and a second closure element part is hinged on the molding body on the second side of the latching recess, opposite from the first side. Consequently, the entire closure element is divided into two and it opens towards both sides of the extrusion direction or lengthwise extension of the molding element.

In order to lock or hold the closure element parts in the first functional position, they are engaged with each other positively and/or non-positively. In one variant of this embodiment, however, the closure element parts can also be joined to each other via a tapered area, preferably a predetermined breaking point.

Once the molding element and the vehicle window pane have been securely installed, the latching recess can be opened at any time in that the positive and/or non-positive connection between the closure element parts is severed and the closure element parts are moved out of the first functional position into the second functional position. This can be done with a separate tool. However, the closure element can also be opened with the rib of the part in that the rib is placed onto the connection between the closure element parts which are then forced into the latching recess when the rib is pressed inwards until each closure element has reached its second functional position and the rib is secured positively and/or non-positively in the latching recess.

Another embodiment of the invention provides that at least one closure element part can be locked inside the latching recess when in the second functional position. In this manner, it is possible to effectively and permanently compensate for restoring forces that might act upon the closure element parts in the hinge or articulation areas.

The closure element can also be used to secure the rib of the part into the latching recess in that the closure element is configured in such a way that, when in the second functional position, it has or forms a latching element for the rib of the part. This makes it possible, for instance, to further improve the stability of the connection between the part and the vehicle window pane.

In this context, the closure element itself can function as the latching element and it can engage positively and/or non-positively with the rib of the part. In addition or as an alternative, however, the closure element can also have or comprise at least one latching element that, in the second functional position, engages positively and/or non-positively with the rib of the part.

Another embodiment of the invention provides that a latching element for the rib of the part is formed inside the latching recess. This can be a separate or additional latching element. The separate or additional latching element, however, can also be identical to the latching element provided on the closure element.

According to an advantageous embodiment of the invention, the latching element of the closure element and/or the latching element formed inside the latching recess forms a barb relative to the rib of the part. This allows the part to be installed quickly and conveniently at any time, since its rib can be inserted into the latching recess with relatively little resistance or use of force. As a result, considerably smaller forces act upon the molding element and on its connection to the vehicle window pane, so that the molding can no longer inadvertently be detached from the window pane, even after the part has been removed and reinstalled several times. Moreover, a complex support of the molding element vis-à-vis the car body is no longer necessary, which is beneficial in terms of the production and installation costs. Furthermore, annoying noises can no longer occur as is the case when the support of the molding element and the car body move relative to each other.

Another embodiment of the molding element according to the invention provides that the closure element is joined to the molding body along the lengthwise extension of the molding element via tapered areas. In this case, hinges or articulations are no longer used for purposes of pivoting the closure element(s) out of the first functional position into the second functional position. Rather, the tapered areas constitute predetermined breaking points that break open when the rib of the part is inserted into the latching recess, thus allowing the rib to latch with the molding body.

In order for a flush surface transition to be formed between the part and the vehicle window pane, the first section of the molding element is configured so as to be L-shaped, whereby the first section of the molding body has a molding leg that is glued to the lower edge of the vehicle window pane, for instance, using an adhesive layer or an adhesive bead. In this embodiment, the molding element is glued to the underside of the vehicle window pane whereby, due to the L-shape, it does not protrude beyond the surface of the vehicle window pane.

Depending on the application case or on customer requirements, it can be advantageous for the first section of the molding element to be configured so as to be U-shaped. This first section is then placed onto the vehicle window pane, whereby the legs of the molding body overlap the edge area of the vehicle window pane.

In order to reliably seal the transition area leading from the vehicle window pane to the part, an embodiment of the invention also provides that the molding body has or comprises a sealing lip. This sealing lip can lie inside the U-shaped molding element, or else it can be configured as a projection on one leg of the U-shaped molding or else, when a molding element with a first section having an L-shaped cross section is used, it can be configured in such a way that a smooth and flush transition is formed between the vehicle window pane and the part.

In another embodiment of the invention, at least one reinforcement insert is provided, at least in certain sections, in the molding body and/or in the closure element. As a result, the material properties of the molding element can be varied individually. Here, it is possible to employ the reinforcement insert, for instance, a metal insert, as a hinge between the molding body and the closure element. Especially in the hinge area, it is likewise possible to provide inserts in the form of nonwoven fibers, fabrics or the like, which allow the closure element to easily move out of the first functional position into the second functional position.

With the molding element according to an embodiment of the invention, it is possible to create a sealing arrangement for the transition area between the window pane of a vehicle and a part, especially for the lower area of a vehicle window pane, said arrangement completely dispensing with the need for separate keder rails or support rails. Nevertheless, the molding element is reliably protected against the penetration of dirt in the area of the usually fragile latching recess as well as against damage, since the closure element formed on the molding body creates a sort of cavity molding that is located in the area of the latching recess and that can easily withstand even strong forces. When, in contrast, the closure element is opened in that it is moved out of its first functional position into a second functional position, the part that is to be installed can be quickly and reliably latched by means of its rib to the molding element.

FIG. 1 shows a vehicle window pane 90, especially a windshield for a motor vehicle. A molding element generally designated by the reference numeral 10 is mounted at the lower edge 92 of the windshield 90. This molding element serves to join a part 80 to the vehicle window pane 90. The latter is usually delivered already pre-assembled with the molding element and then firmly installed, preferably glued, to the car body. The part 80 can be, for instance, a water trough cover that is latched with a rib 82 in the molding element 10 in such a way that a tight and stable connection is created which can also be severed as required.

Using the molding element 10, other parts 80 can also be joined to the vehicle window pane 90 such as, for example, another car body part, e.g. a door frame, a window frame, a trim strip or a cover, that has to be joined to a firmly installed window pane. The vehicle window pane itself can be a windshield as well as a sunroof, a rear window or a side window.

Figure 2:
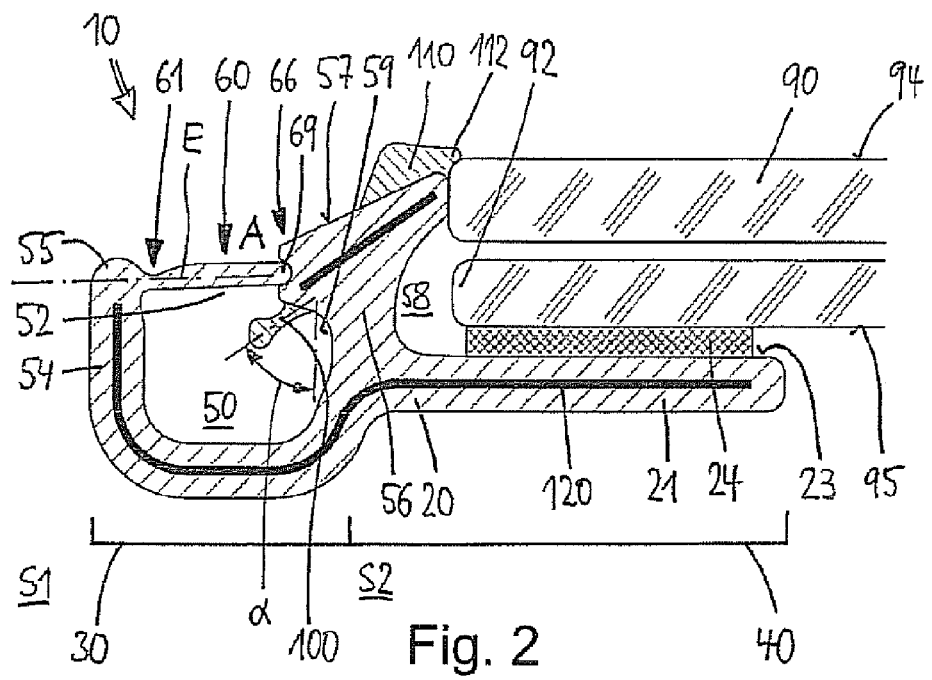
FIG. 2 a sectional view of a molding element according to an embodiment of the invention, which has a closure element and is installed on a vehicle window pane.
Figure 3:
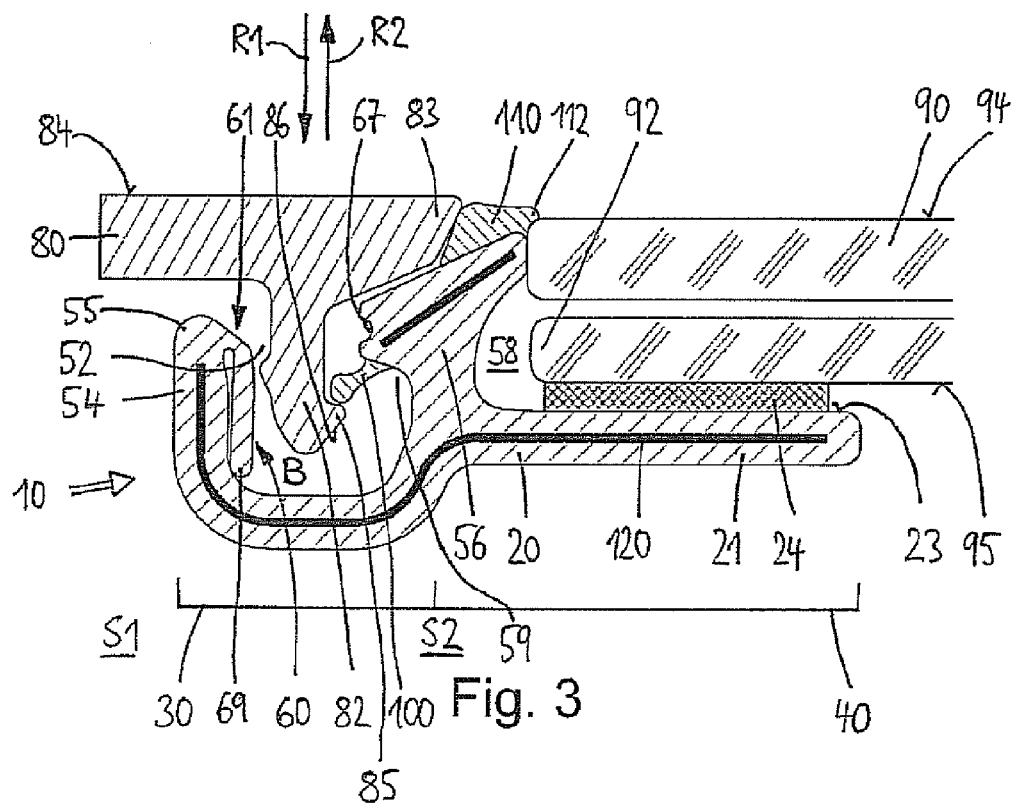
FIG. 3 the molding element from FIG. 2, with the installed part.

A first embodiment of a molding element according to the invention is shown in FIG. 2. This element serves to join a windshield 90 made of laminated glass to a water trough cover 80 that is normally made of plastic. An upper edge 83 of the water trough cover 80 adjoins the usually curved lower edge 92 of the windshield 90 so that the water that runs off the windshield is drained to the outside. The outer surface 84 of the water trough 80 is essentially flush with the outer surface 94 of the windshield 90, as shown in FIG. 3.

The molding element 10 is preferably an extruded molding made by an extrusion process. The resulting molding strip extends in the extrusion direction R, which is identical to the lengthwise extension L of the molding element 10. Perpendicular to the lengthwise extension L, the molding element 10 has a cross section that is adapted to the requirements of the specific installation situation, for example, as a function of the dimensions and geometry of the water trough cover 80 and/or of the windshield 90.

Each molding element 10 is cut to match the width of the windshield 90 or the width of the water trough cover 80, and is glued to the back side of the pane 90, that is to say, facing the vehicle interior. It is made of one or more plastics (thermoplastics or thermoset plastics) having a suitable hardness, for instance, polypropylene (PP), polyvinyl-chloride (PVC), acrylonitrile-butadiene-styrene copolymers (ABS) or the like and/or combinations thereof. However, elastomers or rubber materials such as, for example, EPDM, can also be employed.

A first section 40 of the molding element 10 is configured so as to be approximately L-shaped in its entirety. In order to be secured to the vehicle window pane 90, it has a molding leg 21 with an essentially flat surface 23. An adhesive layer 24 in the form of double-sided adhesive tape that can be heat-activated, for instance, is applied onto the surface 23. The molding leg 21 with the adhesive tape 24 is pressed along the pane edge 92 onto the back 95 of the vehicle window pane 90 and glued to it. In addition or as an alternative, the molding leg 21 can also be glued to the pane 90 using an adhesive bead. Such adhesive beads can also partially overlap the molding leg 21.

The molding element 10 also has a second section 30 which, for purposes of detachably fastening the water trough cover 80, has a latching recess 50 extending in the lengthwise extension L of the molding element 10, whereby the water trough cover 80 is provided with a rib 82 that likewise extends in the lengthwise extension L of the molding element 10 and that can be secured positively and/or non-positively in the latching recess 50. It can be seen in FIG. 3 that, when the water trough cover 80 is in the installed state, the rib 82 extends in an insertion direction R1 that runs approximately perpendicular to the lengthwise extension L as well as perpendicular to the outer surface 84 of the water trough cover 80 or perpendicular to the outer surface 94 of the windshield 90. Moreover, the vehicle window pane 90, the molding element 10 and the water trough cover 80 are arranged in such a way that the normally resilient rib 82 of the water trough cover 80 can be inserted into the latching recess 50 of the molding element 10 in the insertion direction R1 and it can be detached from the molding element 10 with a greater deal of force in the opposite direction R2.

The latching recess 50 is delimited by an essentially L-shaped, U-shaped or hook-shaped spring leg 54 as well as by a support rib 56 which is formed in the transition between the first section 40 and the second section 30 of the molding element 10. In this context, the free end 55 of the spring leg 54 and the support rib 56 form an engagement opening 52 for the rib 82 of the water trough cover 80. In the depiction of FIGS. 2 and 3, the free end 55 of the spring leg 54 runs along the lengthwise extension L of the molding element 10 on a first side S1 of the latching recess 50, while the support rib 56 is located along the lengthwise extension L of the molding element on a second side S2 which, relative to the engagement opening 52, is located opposite from the first side S1 of the latching recess 50.

Between the lower edge 92 of the window pane 90 and the inwards-projecting rib 82 of the water trough cover 80, the support rib 56 forms a clamping or support element that supports a sealing element 110 on a surface 57. The sealing element 110 is preferably made of a flexible material, for instance, a thermoplastic elastomer (TPE), foam rubber or another suitable material such as, for example, an elastomer or rubber material. A tongue edge 112 of the sealing element rests on a lower edge 92 of the vehicle window pane 90 so as to seal it and, after the water trough cover 80 has been installed, it is pressed between the lower edge 92 of the pane 90 and the upper edge 83 of the water trough cover 80 in such a way that the outer surface of the sealing element 110 is flush with the outer surface 94 of the window pane 90 and the outer surface 84 of the water trough cover 80. Consequently, an essentially smooth and flush transition is created between the vehicle window pane 90 and the water trough 80.

The sealing element 110 is preferably integrally bonded to the support rib 56. However, it can also be configured in one single piece with it.

The support rib 56 and the molding leg 21 essentially form the L-shaped cross section of the first section 40 of the molding element 10, whereby a cavity 58 is formed in the area of the pane edge 92. Therefore, in its mounted position, the support rib 56 that is supported against the pane 90 can yield elastically. As a result, in turn, not only is a durable and reliable seal attained, but also, the support rib 56 and the sealing lip 110 can compensate for tolerances between the pane 90 and the water trough cover 80.

The free end 55 of the spring leg 54 has a closure element 60 which extends along the lengthwise extension L of the molding element 10, which is configured in one single piece on the molding body 20, and which seals off the latching recess 50 or its engagement opening 52 when in the functional position designated with the reference letter A.

A hinge area 61 is formed between the spring leg 54 of the molding body 20 and the closure element 60 on the first side S1 of the latching recess 50. As depicted in FIGS. 2 and 3, this hinge area 61 is, for instance, a tapered material area that allows the closure element 60 to pivot around an axis parallel to the lengthwise extension L of the molding element 10, so that the closure element 60 can be pivoted out of the functional position A shown in FIG. 2 into a functional position B shown in FIG. 3. The material thickness of the molding body 20 in the hinge area 61 is selected in such a way that the closure element 60 can be pivoted relatively easily and nevertheless remain stable in and of itself.

On the second side S2 of the latching recess 50, opposite from the first side S1, the closure element 60 is engaged positively and/or non-positively with the molding body 20 along the lengthwise extension L of the molding element 10. For this purpose, a latching area 66 is formed in the support rib 56 and this latching area 66 is at about the same height as the hinge area 61, relative to the molding leg 21 of the molding body 20. The latching area 66 is preferably formed by a latching recess 67 that likewise extends in the lengthwise extension L of the molding element 10. In the functional position A, the free edge 69 of the closure element 60 engages positively and/or non-positively with the latching recess 67, so that the engagement opening 52 of the latching recess 50 is initially closed over the entire length of the molding element 10.

It can be seen in FIG. 2 that the closure element 60 is essentially a flat element whose plane E in the functional position A is oriented approximately perpendicular to the lower edge 92 of the vehicle window pane 90, that is to say, the plane E of the closure element 60 and the outer surface 94 of the vehicle window pane 90 are approximately parallel to each other, at least in the edge area of the pane 90. Moreover, the closure element 60 is hinged on the spring leg 54 of the molding body 20 on the first side S1 in the hinge area 61, whereas the opposite free edge 69 detachably engages into the latching recess 67 of the support rib 56.

In this manner, like a cover, the closure element 60 closes off the latching recess 50 and, as long as the closure element 60 is in the functional position A, the latching recess 50 is effectively protected against the penetration of dirt and dust.

Moreover, when in the functional position A, the closure element 60 bridges the engagement opening 52 of the latching recess 50, so that the free end 55 of the spring leg 54 can be supported on the support rib 56 of the molding body 20 via the closure element 60. This has the following effect: if a force is exerted onto the molding body 20 in the area of the spring leg 54 during the installation of the molding element 10 or during the storage or handling of the vehicle window pane 90, the closure element 60 prevents the spring leg 54 from being compressed while also preventing the latching recess 50 from being deformed.

The closure element 60 thus forms a sort of support that gives the molding element 10 a hollow cross section in the second section 30. This gives the molding element 10 a very high degree of stability overall, and the possibility even exists to place the vehicle window pane 90 upright with its entire weight resting on the molding element 10, without this causing deformation of the latching recess 50 or damage to the spring leg 54. The closure element 60 introduces the force that is being exerted on the spring leg 54 directly into the support rib 56, which is supported on the back at the edge of the vehicle window pane 90. In this process, the latching area 66 on the molding body 20 ensures that the closure element 60 cannot deflect to the side or bend away, but rather that it stays in the functional position A.

Therefore, there is no longer a need for separate keder rails that have to be laboriously inserted into a molding element 10 and then manually removed after the pane has been installed in the vehicle, which used to be necessary in order to protect the molding element 10 against deformation or damage in the area of the fragile latching recess 50. Rather, a keder rail is already integrated with the closure element 60 in the molding element 10 according to an embodiment of the invention, that is to say, the closure element 60 is an integral part of the molding element 10.

Nevertheless, it is possible at any time to install the water trough cover 80 in that its rib 82 is inserted into the latching recess 50. All that is necessary for this purpose is to open the latching recess 50 and to pivot the closure element 60 towards the inside via the hinge area 61. In this functional position B, the closure element 60 releases the engagement opening 52 of the latching recess 50 and the rib 82 can be secured in the molding element 10 in the usual manner.

The latching recess 50 can be opened by means of a tool with which the closure element 60 is pressed into the latching recess 50. In this process, the edge 69 of the closure element 60 comes out of the latching recess 67 in the support rib 56 and the closure element 60 is pivoted towards the inside.

However, in order to open the latching recess 50, it is also possible to employ the rib 82 of the water trough cover 80 in that it is simply placed onto the closure element 60 and pressed inwards into the latching recess 50. In this manner as well, the closure element detaches from the latching area 66 of the support rib 56. It reaches its second functional position B and the rib 82 can latch in the molding element 10. Therefore, the latching recess 50 is opened and the water trough cover 80 is secured in a single work step, which is extremely favorable for the handling of the molding element 10. There is no need to remove a separate keder rail from the molding element 10 nor to dispose of it.

In an alternative embodiment to the latching area 66 formed in the support rib 56, when the closure element 60 is in the first functional position, it can also be joined in a single piece to the molding body 20 via a tapered area along the lengthwise extension L of the molding element 10 on the second side S2 of the latching recess 50 that is opposite from the first side S1. This tapered area is configured here in such a way that it securely affixes the closure element 60 in the functional position A, whereas it breaks open when a tool or the rib 82 of the water trough cover 80 is inserted into the latching recess 50, thus allowing the closure element 60 to pivot into the functional position B.

A latching element 100 is provided for positively and/or non-positively securing the rib 82 in the latching recess 50. This latching element 100, as shown in FIGS. 2 and 3, can be configured as a rib that extends in the lengthwise extension L of the molding element 10. This is an at least partially elastically deformable body that is made by co-extrusion of a flexible material, for instance, a thermoplastic elastomer (TPE), foam rubber or another suitable material that is made, configured and arranged in such a manner that the rib 82 of the water trough cover 80 can be inserted into the latching recess 50 in the insertion direction R1 using relatively little force, whereas it is considerably more difficult to pull the rib 82 out of the latching recess 50 in the opposite direction R2.

As FIGS. 2 and 3 also show, the latching element 100 is inside the latching recess 50 at an angle α relative to the directions R1, R2 and thus at an acute angle relative to the rib 82 of the water trough cover 80. Moreover, it protrudes, at least in certain sections, into the engagement opening 52 of the latching recess 50 and it can engage therein positively and/or non-positively with the rib 82 of the water trough cover 80, so that the latter is affixed securely and yet detachably when in the installed position.

In order to promote this, the free lengthwise edge of the latching element 100 can be provided with a curved edge or tongue edge, while the rib 82 of the water trough cover 80 is provided with an associated tongue edge 85 or an undercut. As a result, when the water trough cover 80 is in its installed position, the free end of the latching element 100 or its curved edge or tongue edge can be supported on the rib 82 of the water trough cover 80, thereby ensuring a secure and stable latching.

The latching element 100, like the sealing element 110, is secured to the support rib 56, namely in the area of an undercut 59. Moreover, it can have a tapered middle section between the area where it is joined to the support rib 56 and the curved edge or tongue edge formed at the end, so that an approximately concave cross sectional surface is formed. This allows the latching element 100 to deflect sideways or crosswise to its lengthwise extension as soon as the rib 82 of the water trough cover 80 is inserted into the latching recess 50. In order to promote this effect, the rib 82 of the water trough cover 80 is provided at its end with a slanted surface or slanted flank 86 that can push the latching element 100 to the side. Depending on the desired amount of force that should be needed to insert the rib 82 into the latching recess 50, the cross section of the latching element 100 can also be shaped so as to be conical or cuboidal. However, in addition or as an alternative, the latching element 100 can also be made of different materials, at least in certain sections. For example, the tongue edge of the latching element 100 can be made of a harder material than the middle section.

The latching element 100—like the sealing element 110 as well—is preferably integrally bonded to the support rib 56. However, it can also be configured in one single piece with it.

It can be seen in FIG. 3 that, when the rib 82 of the water trough cover 80 is inserted into the latching recess 50, the rib 82 first detaches the closure element 60—which had been held by the latching area 66 and its latching recess 67 in the functional position A—from the latching area 66 and pivots it inwards. In this process, the closure element 60 forces its way past the latching element 100. Subsequently, the rib 82 likewise pushes aside the latching element 100 that protrudes into the engagement opening 52 of the latching recess 50 at an angle α relative to the insertion direction R1, whereby the slanted flank 86 of the rib 82 forces the latching element 100 back into the undercut 59 of the support rib 56.

The hinge area 61, the latching area 66 and the geometry or the elasticity of the latching element 100 are all coordinated with each other in such a way that the force needed for inserting the rib 82 into the latching recess 50 until the final latching position has been reached is not greater than the adhesive force with which the molding element 10 adheres to the vehicle window pane 90. Consequently, the adhesive bond between the molding element 10 and the vehicle window pane 90 is not highly stressed, and fundamentally, there is no need for an additional support of the molding element 10 relative to the car body. Such a support, however, can be provided, if so desired.

As soon as the water trough cover 80 and its rib 82 have reached the envisaged final position, the closure element 60 is inside the latching recess 50 when the former is in the functional position B (see FIG. 3) and the latching element 100 engages behind the tongue edge 85 formed on the rib 82, whereby the curved edge or tongue edge of the latching element 100 is supported positively and/or non-positively on the rib 82. Therefore, the latching element 100 forms a barb that secures the water trough cover 80 or its rib 82 positively and/or non-positively in the latching recess 50 or on the molding element 10.

In order to remove the water trough cover 80, the rib 82 has to be unlatched again. For this purpose, it is necessary to overcome the barb 100 that is positioned crosswise inside the latching recess 50, but this requires considerably more force than the joining procedure does. As a result, the water trough cover 80 is always securely and reliably anchored in the molding element 10 but, whenever necessary, it can be dismantled and then mounted again as described above, without involving the use of considerable force.

Figure 4:
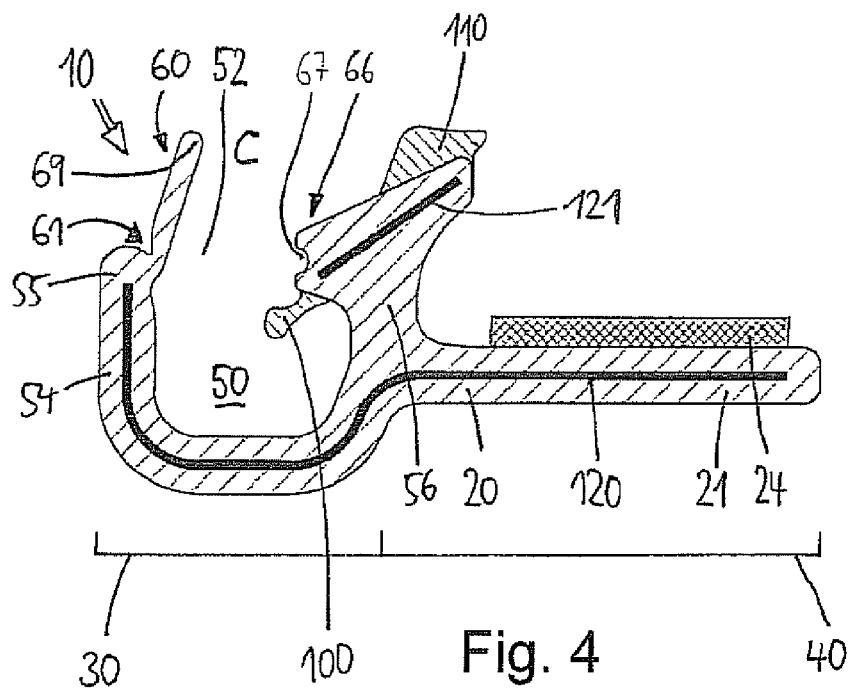
FIG. 4 the molding element from FIG. 2, immediately after its extrusion, the closure element being open towards the outside relative to the latching recess.

FIG. 4 shows the molding element 10 according to an embodiment of the invention, in a state immediately after the extrusion process. Here, the closure element 60 is still in the open position and thus in a third functional position C. This entails the advantage that the molding element 10 or the gap dimension of the latching recess 50 can be calibrated using an instrument, whereby the instrument can extend into the latching recess 50 through the engagement opening 52.

Once the calibration or adjustment procedure has been completed, the closure element 60 is moved into the functional position A using a suitable tool. In this process, the closure element 60 is pivoted around the hinge area 61. Subsequently, the molding element 10 can be installed on a vehicle window pane 90 as described above.

Figure 5:
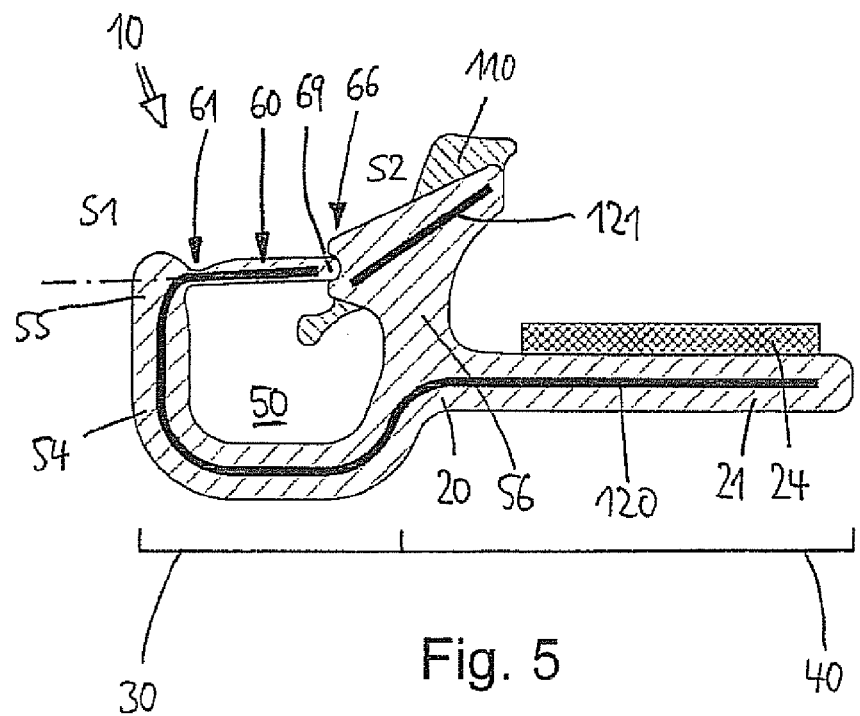
FIG. 5 a sectional view of another embodiment of a molding element according to the invention, which has been fitted with a reinforcement insert.

The molding element 10 shown in FIG. 5 is essentially structured like the molding element of FIGS. 2 to 4. Consequently, identical elements are designated by the same reference numerals, which will also apply to all of the other embodiments below. Therefore, all of these embodiments involve the same basic notion, namely, to integrate a keder rail in the form of a closure element 60 into the molding element 10 in such a way that there is no need to insert a separate keder rail in the molding element 10 or to later remove it with great effort. Nevertheless, before the water trough cover or another part is mounted, the molding element 10 should be reliably protected against external forces that could cause a deformation of the usually fragile latching recess. This is where the closure element 60 comes in, which can be pivoted out of a first functional position A into a second functional position B.

FIG. 5 shows a reinforcement insert 120 that extends in the lengthwise extension L of the molding element 10 and that has been inserted into the molding body 20 of the molding element 10, which is also the case in the embodiment of FIGS. 2 to 4. Perpendicular to the lengthwise extension L, the reinforcement insert 120 extends from the molding leg 21 of the first section 40 all the way to the spring leg 54 of the second section 30. Another, separate reinforcement insert 121 is formed in the support rib 56.

In contrast to the embodiment of FIGS. 2 to 4, the reinforcement insert 120 in FIG. 5, however, extends all the way into the closure element 60, which therefore is likewise configured so as to be reinforced in and of itself. The same holds true for the hinge area 61, which can be individually adjusted in terms of its elasticity or plasticity by means of the reinforcement insert 120. Thus, for instance, the reinforcement insert 120 can ensure that, for one thing, the resistance is not excessive when the closure element 60 is pivoted. At the same time, the reinforcement insert 120 can ensure that the closure element 60 remains in the functional position B and does not return to the functional position A after the rib 82 of the water trough cover 80 has been detached from the latching recess 50.

Figure 6:
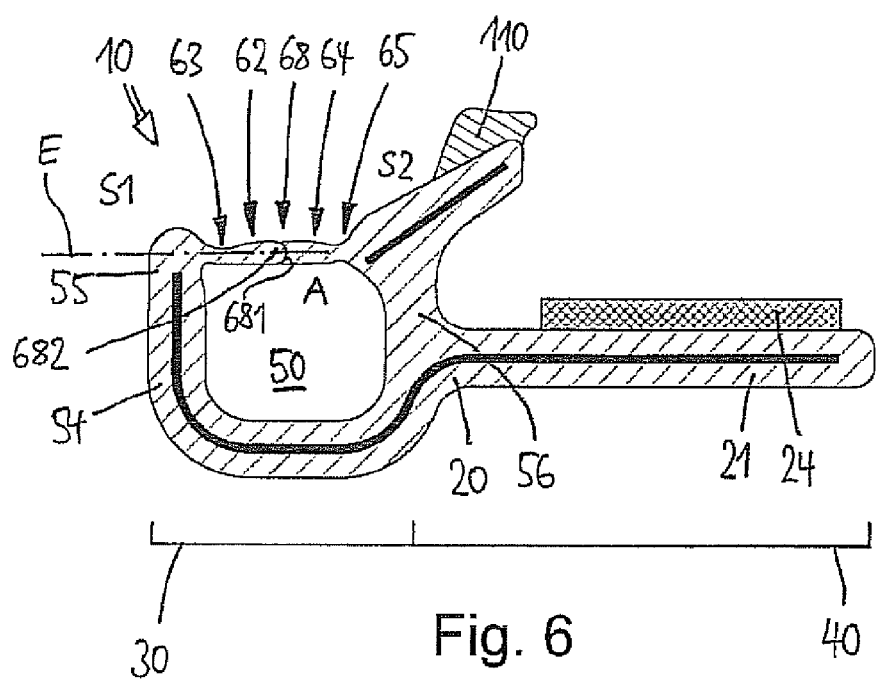
FIG. 6 a sectional view of another embodiment of a molding element according to the invention, which has a closure element divided into two.
Figure 7:
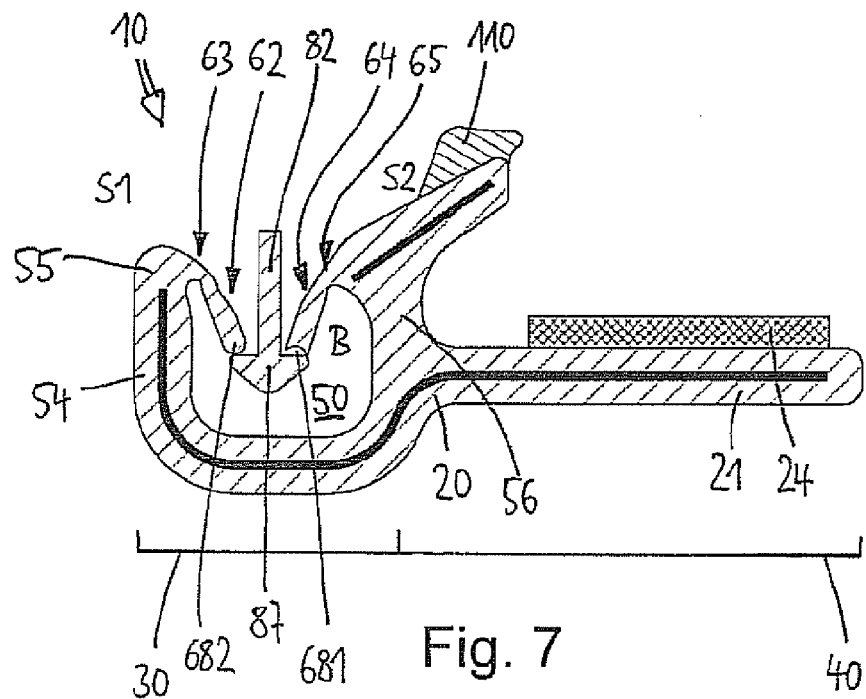
FIG. 7 the molding element from FIG. 6, with the installed part, whereby only the rib of the part is shown.

In the embodiment shown in FIGS. 6 and 7, the closure element is formed by two closure element parts 62, 64 which, in the functional position A, close off the latching recess 50 in the middle. Towards this end, a first closure element part 62 is formed along the lengthwise extension L of the molding element 10 on the first side S1 of the latching recess 50, while on the opposite second side S2, a second closure element part 64 is hinged on the molding body 20.

Between the closure element parts 62, 64 and the spring leg 54 of the molding body 20 on the one hand, and the support rib 56 of the molding body 20 on the other hand, there is a hinge area 63, 65, respectively. Here, too, these are preferably tapered material areas that allow the appertaining closure element parts 62, 64 to pivot around an axis parallel to the lengthwise extension L of the molding element 10, so that closure element parts 62, 64 can be pivoted out of the functional position A shown in FIG. 6 into a functional position B shown in FIG. 7. The material thickness of the molding body 20 in the hinge areas 63, 65 is selected in such a way that the closure element parts 62, 64 can be pivoted relatively easily and yet they remain stable in and of themselves. Both hinge areas 63, 65 are at approximately the same height with respect to the molding leg 21 of the molding body 20.

Between the closure element parts 62, 64, there is a latching area 68 so that the closure element parts 62, 64 can positively and/or non-positively engage with each other when they are in the first functional position A. The latching area 68 can be formed by a latching groove 681 that is created in the lengthwise extension L of the molding element 10 in the lateral edge of one of the closure element parts 62, 64. In the functional position A, the lateral edge 682 of the other closure element part 62 or 64 engages with the latching groove 681, so that the engagement opening 52 of the latching recess 50 is at first closed in the middle over the entire length of the molding element 10 and the spring leg 54 is supported on the support rib 56 via the closure element parts 62, 64. Moreover, it can be seen in FIG. 6 that here, too, the closure element parts 62, 64 lie in a plane E so that a force being exerted onto the spring leg 54 is always introduced into the support rib 56 via the closure element parts 62, 64.

In this manner, the closure element parts 62, 64, as protective covers, close off the latching recess 50 so that the latter is reliably protected against the penetration of dirt and dust as long as the closure element parts 62, 64 are in the functional position A. Moreover, in the functional position A, the closure element parts 62, 64 bridge the engagement opening 52 of the latching recess 50 so that the latter is reliably protected against deformation or damage.

In an alternative embodiment, the closure element parts 62, 64 can be formed as a single piece in the middle along the lengthwise axis L, namely, in the form of a tapered area creating a predetermined breaking point that breaks open when the rib 82 of the window pane 80 penetrates into the latching recess 50.

When the rib 82 of the water trough cover 80 is placed onto the closure element parts 62, 64 and is subsequently pushed through them into the latching recess 50, the closure element parts 62, 64 deflect inwards and sideways via the hinge areas 63, 65 until the rib 82, which is preferably provided with an end area 87 that has a mushroom-shaped cross section, latches behind the closure element parts 62, 64. Therefore, in the functional position B, the closure element parts 62, 64 themselves form latching elements that secure the rib 82 in the latching recess 50. In this context, the rib 82 can be inserted in the insertion direction R1 into the latching recess 50 with less force than is needed for pulling the rib 82 out of the latching recess 50 in the opposite direction R2. The reason for this is that, in the functional position B, the closure element parts 62, 64, as shown in FIG. 7, are positioned at an angle that is slanted with respect to the direction R2 and therefore, they act as barbs for the rib 82 and its end area 87.

Figure 8:
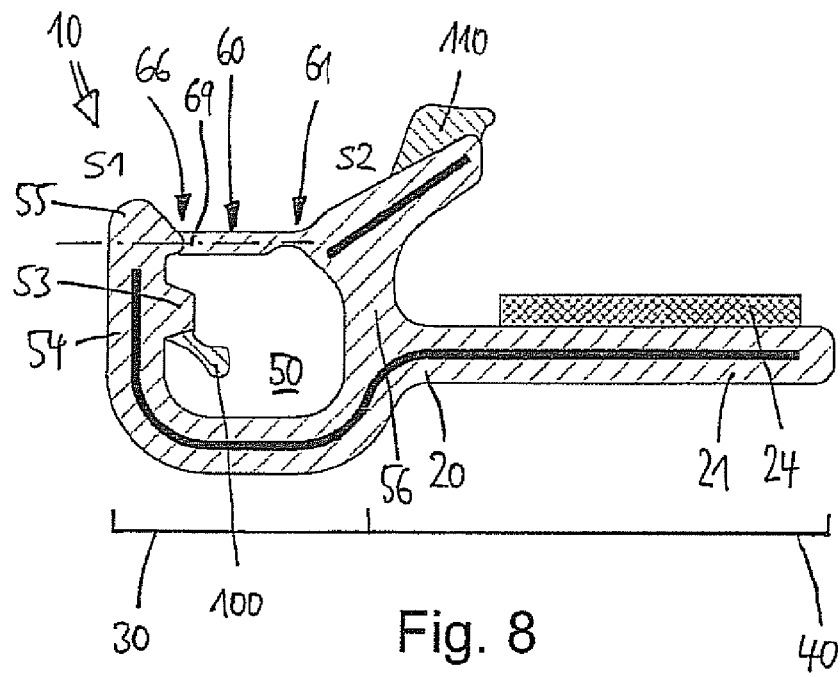
FIG. 8 a sectional view of another embodiment of a molding element according to the invention, which has a closure element and a latching element formed in the latching recess.

The molding element 10 according to an embodiment of the invention shown in FIG. 8 has a mirror-image configuration in comparison to the preceding embodiments. The closure element 60, which is a single part here again, is hinged on the support rib 56 on the second side S2 via a hinge area 61, whereas the latching area 66 on the opposite side S1 is configured on the free end 55 of the spring leg 54. Here, however, the free edge area 69 of the closure element 60 is provided with a latching groove while, at the end, the spring leg forms a latching projection which engages positively and/or non-positively with the latching groove in the functional position A.

In comparison to the previous embodiments, here, the latching element 100 is arranged on the other side, namely, on the first side S1. It is attached to a projection 53 that forms an undercut for the latching element 100, so that, when the rib 82 of the water trough cover 80 is inserted, it can deflect towards the back. For the rest, the molding element of FIG. 8 works as already explained above.

Figure 9:
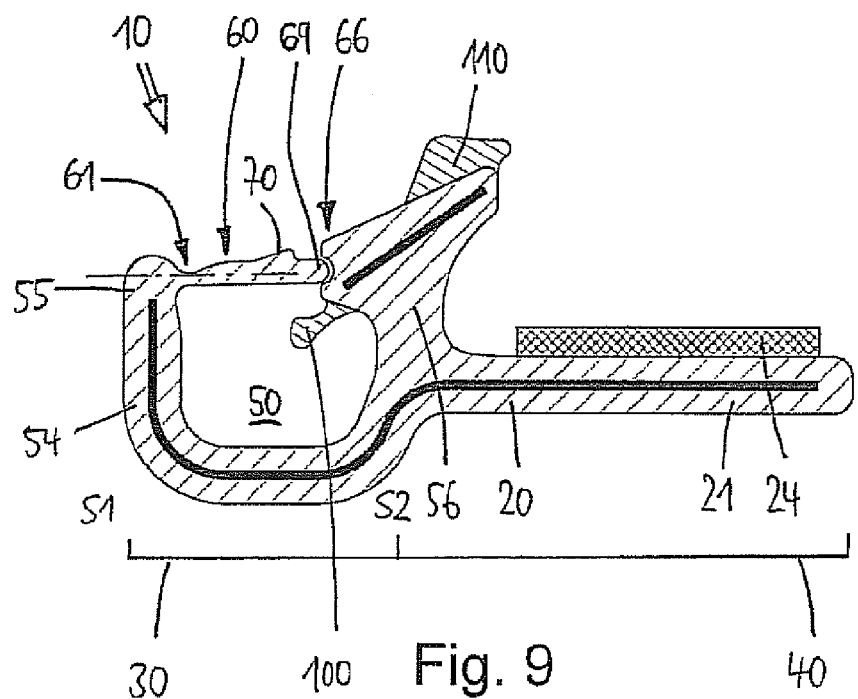
FIG. 9 a sectional view of another embodiment of a molding element according to the invention, which has a closure element, whereby a latching element has been formed on the closure element.
Figure 10:
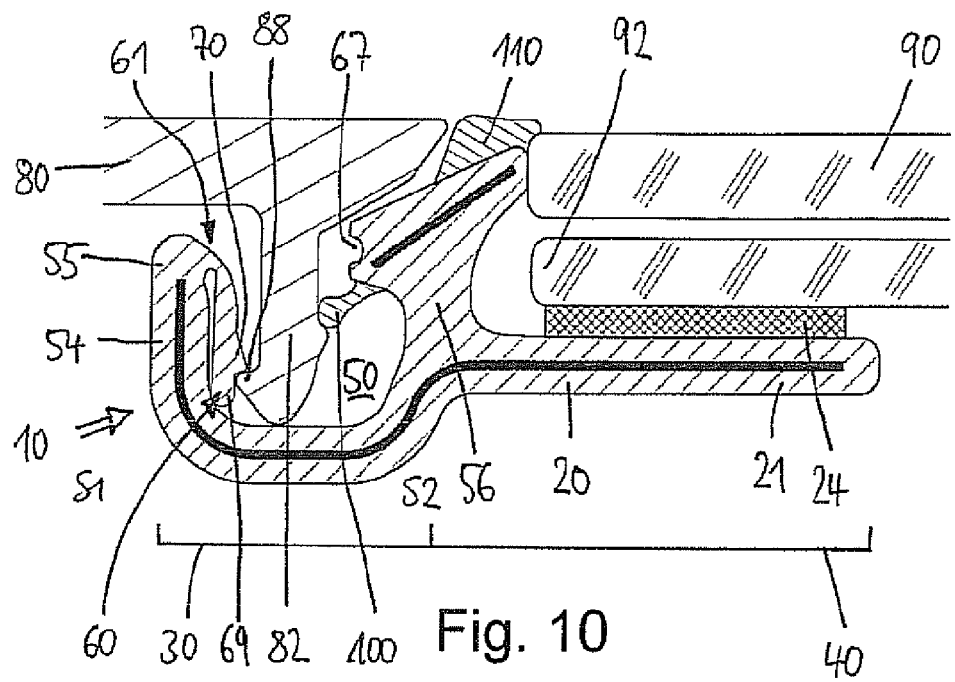
FIG. 10 the molding element from FIG. 9, affixed to the vehicle window pane and with the mounted part.

Another advantageous embodiment is shown in FIGS. 9 and 10. Here, a latching element 70 is provided on the closure element 60, said latching element 70 being shaped in the form of a projection that extends in the lengthwise extension L of the molding element 10 and whose cross section is approximately triangular. As seen in the functional position B, this projection forms an undercut for the rib 82 of the water trough cover 80, said rib 82 being provided with another tongue edge 88 for this purpose.

If, as shown in FIG. 10, the closure element 60 makes a transition from the first functional position A into the second functional position B, the additional tongue edge 88 of the rib 82 of the water trough cover 80 engages behind the projection 70 on the closure element 60. As a result, the rib 82 is held in the latching recess 50 not only by the latching element 100 but also by the latching element 70 of the closure element 60. The latter is likewise locked in the functional position B, so that the rib 82 is always reliably held in the molding element 10.

Figure 11:
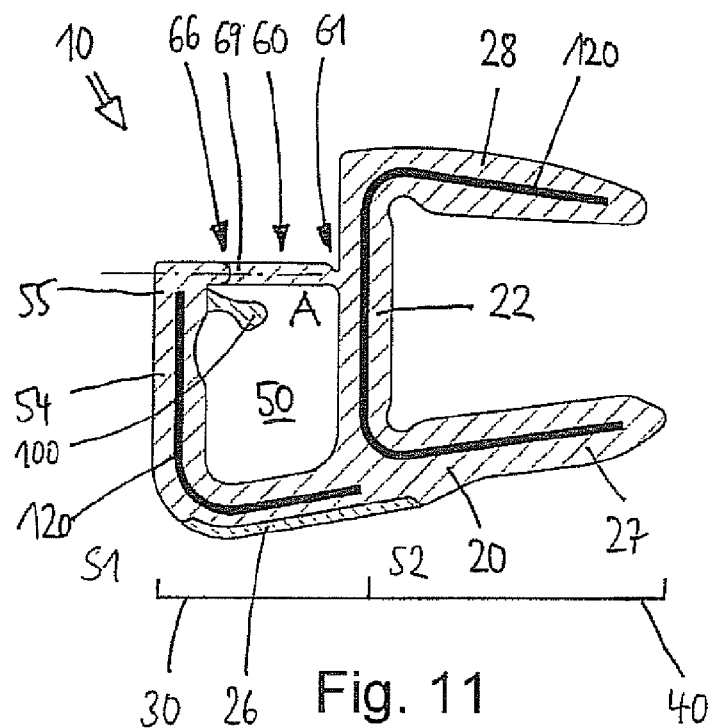
FIG. 11 a sectional view of yet another embodiment of a molding element according to the invention, which has a U-shaped connection to the vehicle window pane and a closure element, whereby a latching element has been arranged in the latching recess.
Figure 12:
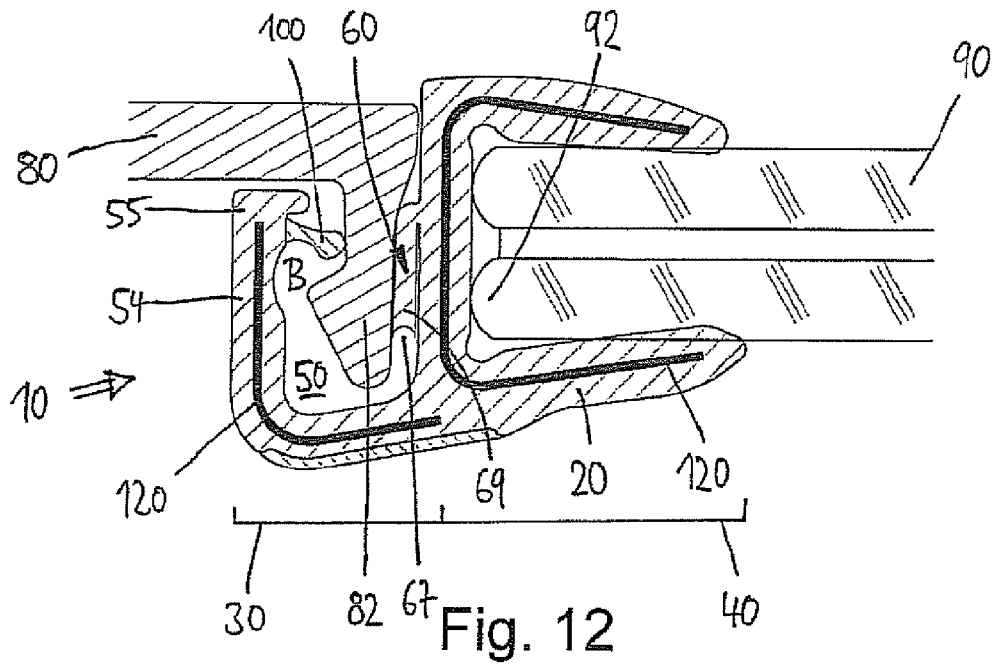
FIG. 12 the molding element from FIG. 11 when affixed to the vehicle window pane, with the mounted part.

The molding element 10 according to an embodiment of the invention shown in FIGS. 11 and 12 is depicted in the first section 40 with a U-shaped configuration instead of an L-shaped configuration. It is an extruded molding made by means of co-extrusion, whereby an insert 26 made of a different material, preferably a stiffer material, is provided on the underside of the spring leg 54. This insert 26 serves, for instance, to optimize the stiffness of the spring leg 54. The molding body 20 extends in the extrusion direction R which here, too, is identical to the lengthwise extension L of the molding element 10. Perpendicular to the lengthwise extension L, the molding element 10 has a cross section that is adapted to the specific requirements of the installation situation, for example, as a function of the dimensions and geometry of the water trough cover 80 and/or of the windshield 90.

At its transition area leading to the second section 30, the U-shaped section 40 of the molding element 10 has a base leg 22 that has a molding leg 27, 28 on each of its ends. These molding legs 27, 28 overlap the edge 92 of a vehicle window pane 90 that has been inserted into the U-molding, and that is clamped by the molding legs 27, 28 that are positioned so as to be slanted slightly inwards, so that the molding element 10 is held non-positively on the edge 92 of the pane 90 (in this context, see FIG. 12).

On its side facing away from the molding legs 27, 28, the base leg 22 has the closure element 60 which extends along the lengthwise extension L of the molding element 10, which is configured as a single piece on the molding body 20, and which closes off the latching recess 50 or its engagement opening 52 when in the functional position designated with the reference letter A in FIG. 11.

A hinge area 61 is formed between the base leg 22 of the molding body 20 and the closure element 60 on the second side S2 of the latching recess 50. As shown, this hinge is, for instance, an area with a tapered material area that allows the closure element 60 to pivot around an axis parallel to the lengthwise extension L of the molding element 10, so that the closure element 60 can be pivoted out of its functional position A shown in FIG. 11 into the functional position B shown in FIG. 12. The material thickness of the molding body 20 in the hinge area 61 is selected in such a way that the closure element 60 can be easily pivoted and nevertheless remain stable in and of itself.

On the first side S1 of the latching recess 50, opposite from the second side S2, the closure element 60 is positively and/or non-positively engaged with the free end 55 of the spring leg 54 along the lengthwise extension L of the molding element 10. For this purpose, the spring leg 54 has a latching area 66 that—relative to the molding legs 27, 28 of the molding body 20—is at approximately the same height as the hinge area 61. The latching area 66 is preferably formed by a latching projection that likewise extends in the lengthwise extension L of the spring leg 54. In the functional position A, the free edge 69 of the closure element 60, into which an appropriate lengthwise groove has been created, is positively and/or non-positively connected to the projection on the spring leg 54, so that the engagement opening 52 of the latching recess 50 is at first closed over the entire length of the molding element 10.

It can be seen in FIG. 11 that the closure element 60 is an essentially flat element whose plane E is oriented approximately perpendicular to the base leg 22 of the molding body 20 and to the lower edge 92 of the vehicle window pane 90, that is to say, the plane E of the closure element 60 and the outer surface 94 of the vehicle window pane 90 are approximately parallel to each other, at least in the edge area of the pane 90. Moreover, the closure element 60 is hinged on the base leg 22 of the molding body 20 on the second side S2 in the hinge area 61, whereas the free edge 69 that is on the opposite side is detachably joined to the spring leg 54.

In this manner, the closure element 60, as a kind of a cover, closes off the latching recess 50 so that the latter is reliably protected against the penetration of dirt and dust as long as the closure element 60 is in the functional position A. Moreover, in the functional position A, the closure element 60 bridges the engagement opening 52 of the latching recess 50, so that the free end 55 of the spring leg 54 can be supported on the base leg 22 of the molding body 20 via the closure element 60. Therefore, the closure element 60 forms a sort of support that gives the molding element 10 in the second section 30 a hollow cross section that protects the latching recess 50 against deformation and damage.

The arrangement, configuration and function of the latching element 100 corresponds to the embodiments already depicted in FIGS. 1 to 10, so that reference is hereby made to their content in their entirety.

Figure 13:
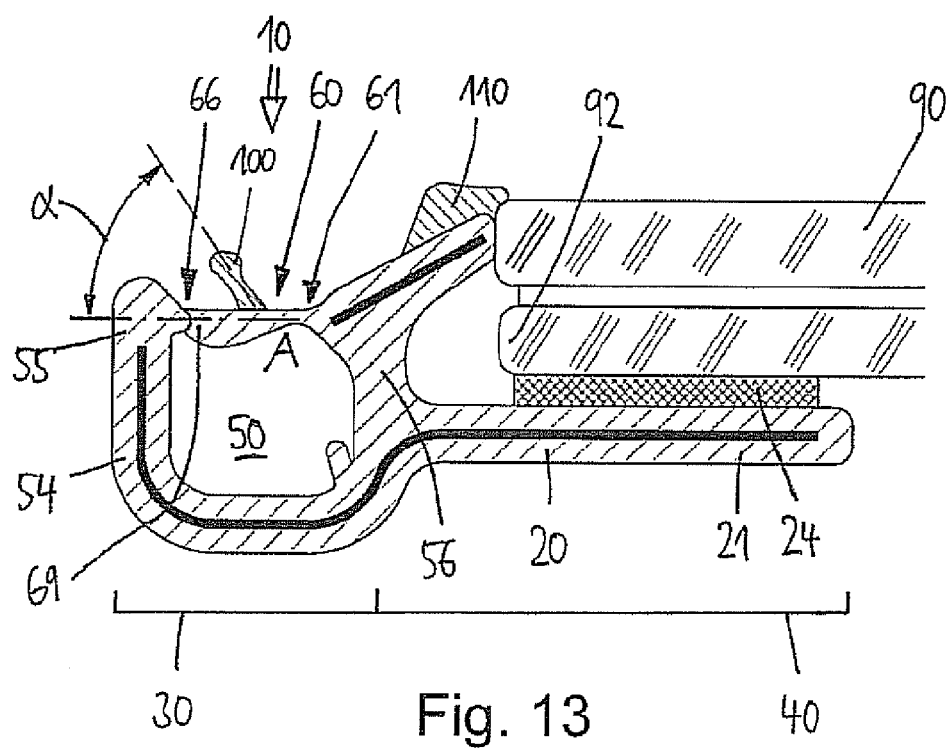
FIG. 13 a sectional view of another embodiment of a molding element according to the invention, which is mounted on a vehicle window pane and which has a closure element and a latching means that is formed in the latching recess for the closure element.
Figure 14:
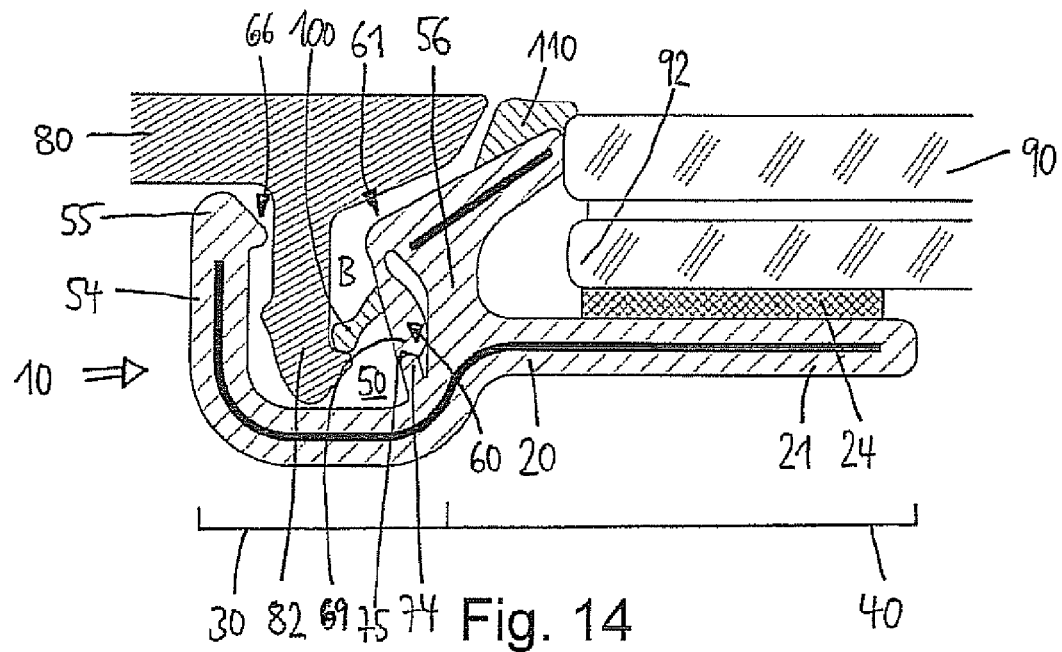
FIG. 14 the molding element from FIG. 13, with the mounted part and the closure element that is secured to the latching means inside the latching recess.

In the embodiment shown in FIG. 13, the latching element 100, which functions like a barb relative to the rib 82 of the water trough cover 80, is not arranged inside the latching recess 50 and on the support rib 56, but rather, it is at first located outside of the latching recess 50 on the closure element 60. If the latter, as depicted in FIG. 14, makes a transition from the functional position A into the functional position B, then the latching element 100 also enters the latching recess 50 where, as described above, it engages behind the rib 82 of the water trough cover 80.

In order for the latching element 100 to always assume a defined position inside the latching recess 50, when the closure element 60 is in the second functional position B, it can be locked in place inside the latching recess 50. For this purpose, the latching recess 50 is provided with a latching projection 74 that extends in the lengthwise extension L of the molding element 10. In the free edge area 69 of the closure element 60, there is a latching groove 75 which engages with the spring leg 54 when the closure element 60 is in the functional position A, and engages with the latching projection 74 when in the functional position B. In this manner, the closure element 60 is securely locked in place in both functional positions A, B so that the closure element 60 can perform its support function, and it can perform its latching function via the latching element 100 after the rib 82 has been inserted into the latching recess 50.

Figure 15:
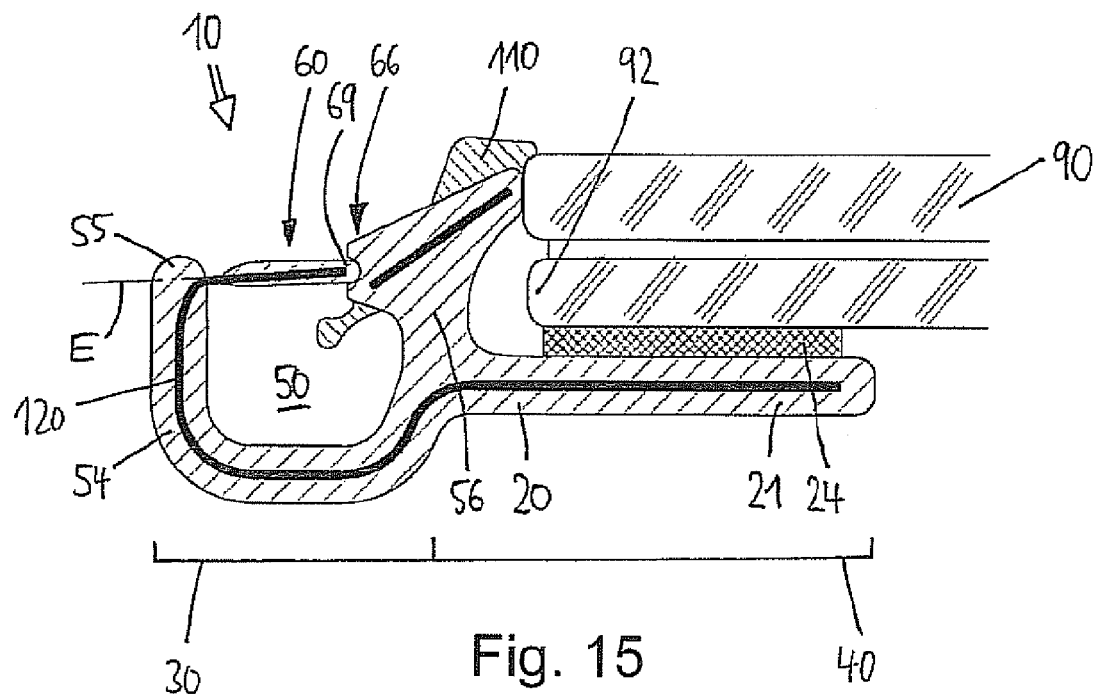
FIG. 15 a sectional view of another embodiment of a molding element according to the invention, which is mounted on a vehicle window pane and which has a closure element that is hinged on the molding body by means of an exposed section of a reinforcement insert.

The embodiment of FIG. 15 shows a variant of the hinge area 61. This area is no longer formed by a tapered material area as was the case above, but rather, part of the reinforcement insert 120 is exposed and this is where it forms the hinge for the closure element 60 which, as described above, can pivot by means of the hinge out of the functional position A into the functional position B.

Figure 16:
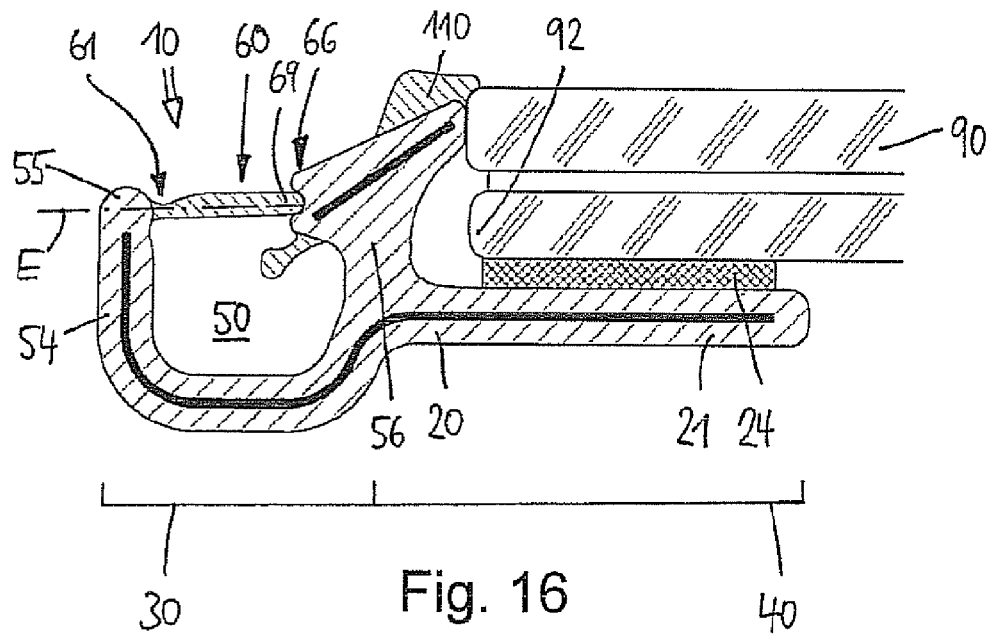
FIG. 16 a sectional view of another embodiment of a molding element according to the invention, which is installed on a vehicle window pane and which has a closure element, whereby the molding body of the molding element and the closure element are made of different materials.

In FIG. 16, the closure element 60 is made of material that differs from that of the molding body 20. However, the closure element 60 and the molding body 20 can also be made of the same material and a different material can be selected only for the hinge area 61.

Figure 17:
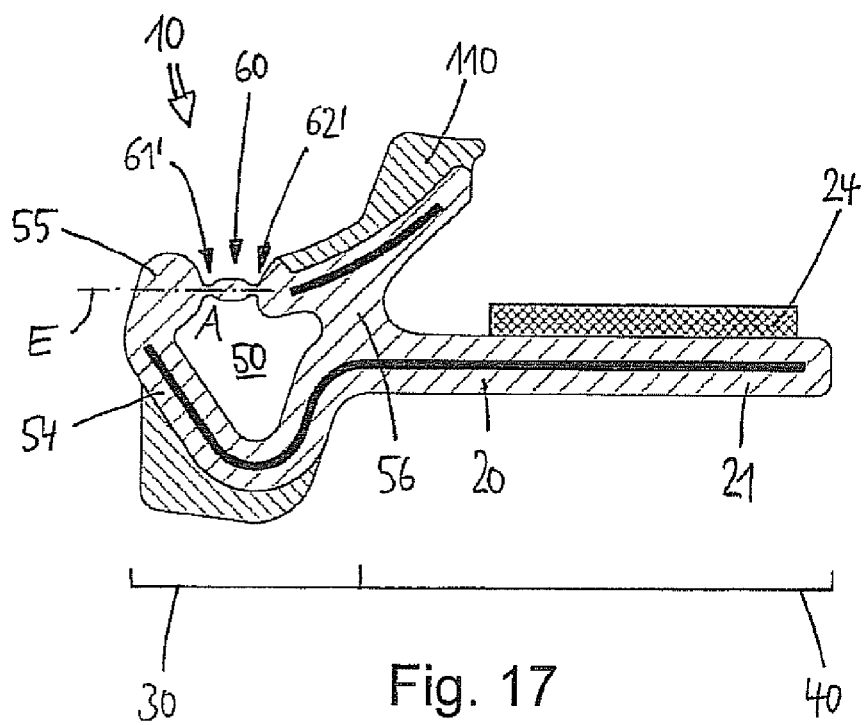
FIG. 17 a sectional view of another embodiment of a molding element according to the invention, which has a closure element that is joined via tapered sections to the molding body of the molding element.
Figure 18:
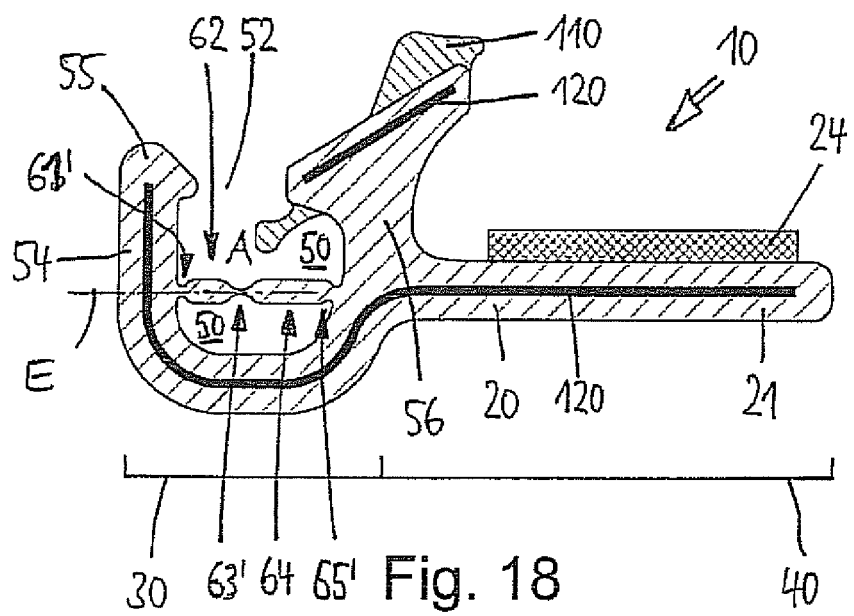
FIG. 18 a sectional view of another embodiment of a molding element according to the invention, which has a closure element that is joined via tapered sections to the molding body of the molding element.

The embodiments in FIGS. 17 and 18 dispense with hinge areas 61, 63, 65 between the closure elements 60, 62, 64 and the molding body 20. Instead, the closure elements 60, 62, 64 are joined to the molding body 20 along the lengthwise extension L of the molding 10 via the tapered areas 61', 62', 63', 65'. The material thickness in these areas 61', 62', 63', 65' is dimensioned in such a way that the closure element 60 in the functional position A can fulfill its support function, but so that the areas 61', 62', 63', 65'—as predetermined breaking points—break open when the rib 82 of the water trough cover 80 is inserted into the latching recess 50 or when the engagement opening 52 is opened by means of a tool.

In the embodiment, three areas 61', 63', 65' are provided as predetermined breaking points. Moreover, the closure element parts 62, 64 are positioned deeper in the latching recess 50, namely, at approximately the height of the molding leg 21 which, as a result, dissipates forces absorbed by the closure element parts 62, 64 when in the functional position A.

In summary, it can be said that the molding element 10 according to an embodiment of the invention and having the integrated closure element 60 performs the followings functions:

protecting the latching recess 50 of the molding element 10 against dirt that could hinder the latching of the rib 82 of the water trough cover 80;

a support/protective function so that the latching recess 50 remains dimensionally stable during the process steps (a) bending the molding, (b) installing it on the pane 90 (especially in the case of U-shaped moldings) and (c) transporting the panes 90, which normally stand upright on the lower edge or on the molding 10.

Consequently, a fundamental idea of an embodiment of the invention is that the tasks that up until now had been performed by a separate keder rail or protective molding can now be fulfilled by the molding element 10 itself. In order to do so, the closure element 60 is integrated into the molding 10, whereby the closure element 60 bridges the latching opening on the molding element 10 during the bending, during the mounting on the pane 90 and/or during the transportation of the panes 90. During the installation of the water trough cover 80, in contrast, the closure element 60 is either destroyed or it flips out of the functional position A into the functional position B, so that the rib 82 of the water trough cover 80 can be inserted into the latching recess 50, where it latches. This can even be done, if applicable, in one step together with the installation of the water trough 80.

The invention is not limited to the embodiment described above, but rather, it can be modified in a wide variety of ways.

For instance, the closure element does not have to be configured so as to be completely continuous along the lengthwise extension L of the molding element 10. Rather, it can also be cut like a comb or else it can be configured in sections, whereby gaps remain between the individual closure element sections.

The same holds true for the configuration of the hinge areas 61, 63, 65 or for the predetermined breaking points 61', 62', 63', 65'. The latter can also be configured in sections along the lengthwise extension L of the molding element with gaps arranged in-between.

With these variants, the latching recess 50 is still very well protected against penetration of dirt. Thanks to the gaps or spacing between the closure element sections and/or the hinge sections, the forces needed to open the closure element 60, or the closure element parts 62, 64, with the rib 82 of the part 80 can be set even more exactly.

The molding element 10 is preferably produced as a separate molding strip by means of an extrusion or co-extrusion process. However, it is likewise conceivable for the molding element 10—depending on the cross section geometry—to be extruded directly onto the edge 92 of the vehicle window pane 90 or else to be applied by means of injection molding.

However, one can see that a molding element 10 for joining a part 80 to a vehicle window pane 90 has a molding body 20 whose first section 40 can be secured to an edge 92 of the vehicle window pane 90 and whose second section 30, for purposes of detachably fastening the part 90 to the molding element 10, has a latching recess 50 which extends in the lengthwise extension L of the molding element 10 and into which a rib 82 of the part 80 can be secured positively and/or non-positively. A closure element 60, 62, 64 that closes off the engagement opening 52 of the latching recess 50 when in a first functional position A and that opens it when in a second functional position B is formed on the molding body 20. For this purpose, the closure element 60, 62, 64 is hinged on the molding body 20 on a first side S1 of the latching recess 50 along the lengthwise extension L of the molding element 10. On the second side S2 of the latching recess 50, opposite from the first side S1, when the closure element 60 is in the first functional position A, it engages positively and/or non-positively with the molding body 20 along the lengthwise extension L of the molding element 10.

All of the features and advantages, including structural details, spatial arrangements and method steps ensuing from the claims, from the description and from the drawing can be used in embodiments of the invention both on their own or in a wide array of combinations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE LETTERS AND NUMERALS

A first functional position
B second functional position
C third functional position
L lengthwise extension
R extrusion direction
R1 insertion direction
R2 opposite direction
S1 first side
S2 second side
α angle
10 molding element
20 molding body
21 molding leg
21 base leg
23 surface
24 adhesive layer/adhesive tape
26 insert
27, 28 molding legs
30 second section
40 first section
50 latching recess
52 engagement opening
53 projection
54 spring leg
55 free end
56 support rib
57 surface
58 cavity
59 undercut
60, 62, 64 closure element
61, 63, 65 hinge area
61', 62', 63', 65' tapered area
66 latching area
67 latching recess
68 latching area
681 latching groove
682 lateral edge
69 free edge area
70 latching element
74 latching projection
75 latching groove
76 latching area
80 part
82 rib
83 upper edge
84 outer surface
85 tongue edge
86 slanted surface/flank
87 end area
88 additional tongue edge
90 vehicle glass pane
92 edge
94 outer surface
95 back
100 latching element
110 sealing lip
112 tongue edge
120, 121 reinforcement insert

The invention claimed is:

1. A molding element for joining a part to a vehicle window pane, comprising:
a molding body having a first section configured to be secured to an edge of the window pane and a second section including a latching recess being configured to receive, in an insertion direction, a rib of the part through an engagement opening so as to detachably fasten the part to the molding element; and
a closure element formed on the molding body so as to at least partially close off the latching recess.

2. The molding element according to claim 1, wherein the latching recess is bounded by a support rib configured to be disposed at the window pane and by a spring leg, the closure element extending substantially perpendicular to the insertion direction between the support rib and the spring leg so as to counteract a force between the support rib and the spring leg.

3. The molding element according to claim 2, wherein the closure element is made up of two closure element parts which engage each other between the support rib and the spring leg or are integrally formed with each other at a predetermined breaking point between the support rib and the spring leg.

4. The molding element according to claim 1, wherein the latching recess is bounded by a support rib configured to be disposed at the window pane and by a spring leg, the closure element extending substantially perpendicular to the insertion direction an entire distance between the support rib and the spring leg.

5. The molding element according to claim 4, wherein the closure element is made up of one or more closure element parts and is configured to move from a first functional position, in which the closure element protects against deformation of the latching recess, to a second functional position, in which the rib is receivable in the latching recess to detachably fasten the part to the molding element.

6. The molding element according to claim 5, wherein the closure element is configured to move from the first functional position to the second functional position by insertion of the rib in the insertion direction into the latching recess.

7. The molding element according to claim 1, wherein the closure element is joined to the molding body along an entire lengthwise extension of the molding element.

8. The molding element according to claim 1, wherein the closure element, in a first functional position, completely closes off the engagement opening of the latching recess and, in a second functional position, opens the engagement opening.

9. The molding element according to claim 1, wherein the closure element is a flat element in a lengthwise extension of the molding element with a plane oriented substantially perpendicular to the insertion direction.

10. The molding element according to claim 1, wherein a hinge area is formed between the molding body and the closure element, the closure element being pivotable about the hinge area.

11. The molding element according to claim 1, wherein the closure element is joined as a single piece or is bonded integrally to the molding body.

12. The molding element according to claim 1, wherein the molding body and the closure element are made of different materials.

13. The molding element according to claim 1, wherein the closure element is hinged on the molding body on a first side of the latching recess along a lengthwise extension of the molding element.

14. The molding element according to claim 13, wherein the closure element, in a first functional position, at least one of positively and non-positively engages the molding body along the lengthwise extension on a second side of the latching recess opposite from the first side.

15. The molding element according to claim 13, wherein the closure element, in a first functional position, is joined to the molding body via a tapered area along the lengthwise extension on a second side of the latching recess opposite from the first side.

16. The molding element according to claim 1, wherein the closure element is formed by first and second closure element parts, the first closure element part being hinged on the molding body on a first side of the latching recess along a lengthwise extension of the molding element, and the second closure element part being hinged on the molding body on a second side of the latching recess opposite from the first side along the lengthwise extension.

17. The molding element according to claim 16, wherein the closure element parts, in a first functional position, are engaged with each other at least one of positively and non-positively.

18. The molding element according to claim 16, wherein the closure element parts, in a first functional position, are joined to each other via a tapered area.

19. The molding element according to claim 1, wherein the closure element, in a second functional position, is configured to be locked inside the latching recess.

20. The molding element according to claim 1, wherein the closure element, in a second functional position, is configured to act as a latching element for the rib of the part.

21. The molding element according to claim 1, wherein, a latching element is disposed on the closure element so as to detachably fasten the rib of the part in the latching recess in a second functional position of the closure element.

22. The molding element according to claim 1, further comprising a latching element disposed in the latching recess and configured to detachably fasten the rib of the part in the latching recess.

23. The molding element according to claim 22, wherein the latching element is configured to form a barb relative to the rib of the part.

24. The molding element according to claim 1, wherein the closure element is joined to the molding body along a lengthwise extension of the molding element via a tapered area.

25. The molding element according to claim 1, wherein the first section of the molding element is L-shaped.

26. The molding element according to claim 25, wherein the first section includes a molding leg having, at least in sections thereof, an adhesive layer.

27. The molding element according to claim 1, wherein the first section of the molding element is U-shaped.

28. The molding element according to claim 1, wherein the molding body has a sealing lip.

29. The molding element according to claim 1, wherein at least one of the closure element and the molding body includes, at least in sections thereof, at least one reinforcement insert.

* * * * *